(12) United States Patent
Shahraray et al.

(10) Patent No.: US 8,090,694 B2
(45) Date of Patent: Jan. 3, 2012

(54) INDEX OF LOCALLY RECORDED CONTENT

(75) Inventors: Behzad Shahraray, Freehold, NJ (US);
David Gibbon, Lincroft, NJ (US); Lee Begeja, Gillette, NJ (US); Zhu Liu, Marlboro, NJ (US); Richard V. Cox, New Providence, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 134 days.

(21) Appl. No.: 11/592,830

(22) Filed: Nov. 2, 2006

(65) Prior Publication Data

US 2008/0124055 A1     May 29, 2008

(51) Int. Cl.
*G06F 7/00*     (2006.01)
*G06F 17/00*     (2006.01)

(52) U.S. Cl. ........ 707/673; 707/711; 707/741; 707/914; 707/915; 707/916; 725/142

(58) Field of Classification Search ............... 725/18, 725/61, 86, 136, 142, 114, 112, 38; 345/530; 707/673, 711, 741, 941, 914, 915, 916
See application file for complete search history.

(56) References Cited

U.S. PATENT DOCUMENTS

| | | | |
|---|---|---|---|
| 6,289,165 B1 | 9/2001 | Abecassis | |
| 6,311,194 B1 | 10/2001 | Sheth et al. | |
| 6,400,996 B1 | 6/2002 | Hoffberg et al. | |
| 6,609,096 B1 | 8/2003 | De Bonet et al. | |
| 6,728,673 B2 | 4/2004 | Furuyama et al. | |
| 6,774,926 B1 | 8/2004 | Ellis et al. | |
| 6,816,857 B1 | 11/2004 | Weissman et al. | |
| 6,912,517 B2 | 6/2005 | Agnihotri et al. | |
| 6,934,964 B1 | 8/2005 | Schaffer et al. | |
| 6,986,154 B1 | 1/2006 | Price et al. | |
| 7,039,298 B1 | 5/2006 | Watkins | |
| 7,039,652 B2 | 5/2006 | Jun et al. | |

(Continued)

FOREIGN PATENT DOCUMENTS

WO     WO-0005884 A1     2/2000

(Continued)

OTHER PUBLICATIONS

"Multimedia Search and Retrieval: New Concepts, System Implementation, and Application"; Qian Huang, Atul Puri, Zhu Liu; IEEE; Dec. 15, 1998.*

(Continued)

*Primary Examiner* — Giovanna Colan
(74) *Attorney, Agent, or Firm* — Guntin Meles & Gust, PLC; Andrew Gust

(57) ABSTRACT

A method to index locally recorded content at a media device includes extracting, at a remote service provider, event index data from an event being locally recorded at a media device and associating the event index data with locator code data of the event. The method further includes storing, at the remote service provider, the extracted event index data and the associated locator code data; searching the extracted event index data for a plurality of segments associated with the event, the search being associated with a search request; determining index display data for a presentation of the plurality of segments based on the search request; and transmitting, to the media device, the locator code data associated with the plurality of segments, and the index display data.

23 Claims, 6 Drawing Sheets

U.S. PATENT DOCUMENTS

| | | | |
|---|---|---|---|
| 7,046,911 B2 | 5/2006 | Zimmerman et al. | |
| 7,139,983 B2 | 11/2006 | Kelts | |
| 7,308,701 B1* | 12/2007 | Kinder et al. | 725/112 |
| 2002/0069218 A1 | 6/2002 | Sull et al. | |
| 2002/0108127 A1* | 8/2002 | Lew et al. | 725/142 |
| 2002/0118950 A1 | 8/2002 | Molinet, III | |
| 2002/0166123 A1 | 11/2002 | Schrader et al. | |
| 2002/0167522 A1* | 11/2002 | Miyazawa | 345/530 |
| 2002/0184195 A1 | 12/2002 | Qian | |
| 2003/0061206 A1 | 3/2003 | Qian | |
| 2003/0085997 A1 | 5/2003 | Takagi et al. | |
| 2003/0093790 A1* | 5/2003 | Logan et al. | 725/38 |
| 2003/0093792 A1 | 5/2003 | Labeeb et al. | |
| 2003/0130979 A1 | 7/2003 | Matz et al. | |
| 2003/0182567 A1 | 9/2003 | Barton et al. | |
| 2003/0187652 A1 | 10/2003 | Fairman | |
| 2003/0202533 A1 | 10/2003 | Taylor | |
| 2003/0202772 A1 | 10/2003 | Dow et al. | |
| 2003/0202773 A1 | 10/2003 | Dow et al. | |
| 2003/0208626 A1 | 11/2003 | Gibbon et al. | |
| 2003/0220100 A1 | 11/2003 | McElhatten et al. | |
| 2004/0034869 A1 | 2/2004 | Wallace et al. | |
| 2004/0177370 A1 | 9/2004 | Dudkiewicz | |
| 2004/0220926 A1 | 11/2004 | Lamkin et al. | |
| 2004/0221311 A1 | 11/2004 | Dow et al. | |
| 2005/0044561 A1* | 2/2005 | McDonald | 725/18 |
| 2005/0132398 A1 | 6/2005 | Baran et al. | |
| 2005/0144635 A1 | 6/2005 | Boortz | |
| 2005/0185823 A1 | 8/2005 | Brown et al. | |
| 2005/0193425 A1 | 9/2005 | Sull et al. | |
| 2005/0210145 A1 | 9/2005 | Kim et al. | |
| 2006/0031216 A1 | 2/2006 | Semple et al. | |
| 2006/0048191 A1 | 3/2006 | Xiong | |
| 2006/0101504 A1* | 5/2006 | Aravamudan et al. | 725/136 |
| 2006/0110128 A1 | 5/2006 | Dunton et al. | |
| 2006/0218183 A1 | 9/2006 | Ivey et al. | |
| 2006/0225097 A1* | 10/2006 | Lawrence-Apfelbaum | 725/61 |
| 2007/0136777 A1* | 6/2007 | Hasek et al. | 725/114 |
| 2007/0162502 A1 | 7/2007 | Thomas et al. | |
| 2007/0174276 A1 | 7/2007 | Sullivan et al. | |
| 2007/0186247 A1 | 8/2007 | White et al. | |
| 2008/0112690 A1 | 5/2008 | Shahraray et al. | |

FOREIGN PATENT DOCUMENTS

| | | |
|---|---|---|
| WO | WO-2005001715 | 1/2005 |
| WO | WO-2007087325 A2 | 8/2007 |
| WO | WO-2007087325 A3 | 4/2008 |
| WO | WO-2008057876 A1 | 5/2008 |

OTHER PUBLICATIONS

"About Tivo", http://www.tivo.com/0.0.asp, (Retrieved Jan. 24, 2006),2 pgs.

"CDfreaks.com", http://www.cdfreaks.com/article/211/8, In search report under General: 2, (Retrieved Jan. 26, 2005),23 pgs.

"Comskip—Sage TV Community Development—Trac", http://www.sage-community.org/index.cgi/wiki/ComSkip, Blackframe method. Blackframes bookending each commercial detected by DVR with less than a pre-defined variable-e.g. standard commercial lengths., (Retrieved Jan. 24, 2006),2 pgs.

"ComSkip Homepage", http://gbpvr.com/pmwiki/pmwiki.php/Manual/ComSkip, Blackframe method. Blackframes bookending each commercial detected by DVR with less than a pre-defined variable-e.g. standard commercial lengths. 2nd of 2 URLs in search report,(Retrieved Jan. 24, 2006),5 pgs.

"Cyberhome (CH) DVR 1500 Operation Guide", ftp://209.237.61.78/cyberhome/1500/manual/1500E.PDF, In search report under "2. Chapter points subdivided into segments of predetermined lengths (Fixed Interval). (optional chapter points at beginning, end, and 5 minutes from end).",(Retrieved Jan. 25, 2006),41 pgs.

"Cyberhome DVR 1500", http://www.cyberhome.com/products.asp?Product=1500, In search report under "2. Chapter points subdivided into segments of predetermined lengths (Fixed Interval). (optional chapter points at beginning, end, and 5 minutes from end).",(Retrieved Jan. 25, 2006),4 pgs.

"GB-PVR", http://www.gbpvr.com, (Retrieved Jan. 24, 2006),3 pgs.

"Pioneer DVR 520-S and 320-S General Information", http://www.pioneerelectronics.com/pna/learn/about/chapters/0,,2076_124669747_124669751,00.html, In search report under General:1,(Retrieved Jan. 26, 2006),3 pgs.

"Pioneer DVR-630H-S Operating Instructions", http://www.pioneer-eur.com/eur/content/support/support/manuals.html, In search report under 2. Chapter points subdivided into segments of predetermined lengths (Fixed Interval). (optional chapter points at beginning, end, and 5 minutes from end),(Retrieved Jan. 24, 2006),127 pgs.

"Pioneer.sound.vision.soul", http://www.pioneerelectronics.com/pna/learn/about/chapters/0,,2076_124669747_124669751,00.html, (Retrieved Jan. 24, 2006),3 pgs.

"Tivo suggestions", http://customersupport.tivo.com/TiVoCollection/9350C8EC-393F-4D9B-8A45-D50B6D0FB2E3/ins_Content.html, Retrieved Oct. 20, 2006,1 pg.

"Tivo Wishlist", http://www.tivo.com/1.2.2.asp, Retrieved Jul. 12, 2006,1 pg.

"U.S. Appl. No. 11/339,223, Response filed Oct. 27, 2008 to Final Office Action mailed Jun. 25, 2008", 11 pgs.

"U.S. Appl. No. 11/351,150, Non-Final Office Action mailed Sep. 5, 2008", 14 Pgs.

"International Application Serial No. PCT/US2007/001816, Preliminary Report on Patentability mailed Aug. 7, 2008", 8 pgs.

"U.S. Appl. No. 11/339,223, Non-Final Office Action mailed Dec. 26, 2007", 15 pgs.

"U.S. Appl. No. 11/339,223, Final Office Action mailed Jun. 25, 2008", 16 pgs.

"U.S. Appl. No. 11/339,223, Response filed Mar. 26, 2008 to Non-Final Office Action mailed Dec. 26, 2007", 12 pgs.

"U.S. Appl. No. 11/351,150, Response filed Jun. 2, 2008 to Non Final Office Action mailed Mar. 3, 2008", 14 pgs.

"U.S. Appl. No. 11/351,150, Non-Final Office Action mailed Mar. 3, 2008", 13 pgs.

"International Application Serial No. PCT/US07/01816, International Search Report mailed Feb. 14, 2008", 4 pgs.

"International Application Serial No. PCT/US07/01816, International Search Report mailed Feb. 14, 2008", 8 pgs.

"International Application Serial No. PCT/US2007/083132, International Search Report mailed Apr. 15, 2008", 6 pgs.

"International Application Serial No. PCT/US2007/083132, Written Opinion mailed Apr. 15, 2008", 8 pgs.

Dimitrova, N., et al., "Applications of Video-Content Analysis and Retrieval", *IEEE Multimedia, IEEE Service Center*, New York, NY, US, vol. 9, No. 3, Jul. 2002, 42-55.

Qian, H., et al., "Multimedia Search and Retrieval: New Concepts, System Implementation and Application", *IEEE Transactions on Circuits and Systems for Video Technology, IEEE Service Center*, Piscataway, NJ, US, vol. 10, No. 5, Aug. 2000, 679-692.

"U.S. Appl. No. 11/339,223, Non-Final Office Action mailed Jan. 18, 2009", 19 pgs.

"U.S. Appl. No. 11/351,150, Final Office Action mailed Mar. 16, 2009", 16 pgs.

"U.S. Appl. No. 11/595,351, Non-Final Office Action mailed Jan. 21, 2009", 11 pgs.

"U.S. Appl. No. 11/339,223, Response filed Apr. 16, 2009 to Non Final Office Action mailed Jan. 8, 2009", 12 pgs.

"U.S. Appl. No. 11/351,150, Response filed Apr. 30, 2009 to Final Office Action mailed Mar. 16, 2009", 13 pgs.

"U.S. Appl. No. 11/351,150 response filed Dec. 4, 2008 to Non-Final Office Action mailed Sep. 5, 2008", 11 pgs.

* cited by examiner

INDEX OF LOCALLY RECORDED CONTENT

FIELD

The application relates generally to the field of multimedia processing, and more specifically to an index of locally recorded content.

BACKGROUND

Broadcasted video programs become available every day, creating a wealth of information and entertainment. The ability to store video, either locally at a user's site, or remotely on remote servers, leads to a potentially large information and entertainment collection.

Having the ability to search through such large local or remote repositories for specific content is useful, especially to save time. However, the searching and retrieving may be difficult or inefficient and may involve transmitting the video program, or some components of it such as images or text, either for replay at the receiving end or for generating a textual and/or pictorial index of the program. Transmitting the video program requires sufficient bandwidth. In the instance where the specific content is located only in a remote repository, retransmitting the content is inefficient.

BRIEF DESCRIPTION OF DRAWINGS

An example embodiment of the present invention is illustrated by way of example, and not limitation, in the figures of the accompanying drawings, in which like references indicate similar elements and in which.

DETAILED DESCRIPTION

According to an aspect of the present subject matter, there is provided a system to remotely index locally recorded content. The method includes extracting, at a remote service provider, event index data from event being locally recorded at a media device and associating the event index data with locator code data of the event. The method further includes storing, at the remote service provider, the extracted event index data and the associated locator code data; searching the extracted event index data for a plurality of segments associated with the event, the search being associated with a search request; determining index display data for a presentation of the plurality of segments based on the search request; and transmitting, to the media device, the locator code data associated with the plurality of segments, and the index display data.

In an embodiment, the service provider is remote from the media device. For example, the service provider may be spaced at a distance from the media device. In another example, the service provider may communicate with the media device through a network. In embodiments where the service provider is local to the media device, the service provider accesses the media device directly without a telecommunications line, for instance.

In the following description, for the purposes of explanation, numerous specific details are set forth in order to provide a thorough understanding of the disclosed embodiments. It will be apparent, however, to one skilled in the art that the disclosed embodiments may be practiced without some of these specific details. In other instances, well-known structures and devices are shown in block diagram form.

Example System Environment

Figure 1:
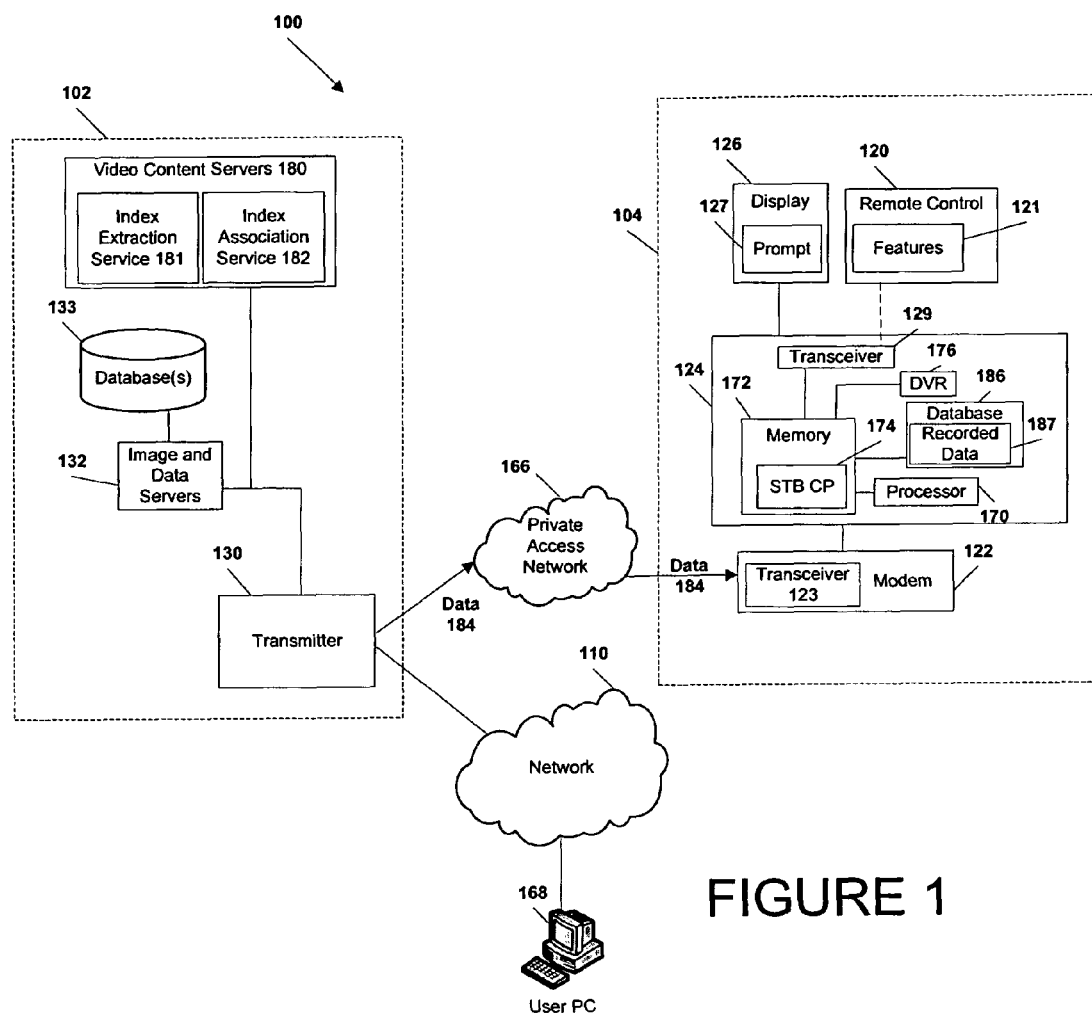
FIG. 1 illustrates a system environment in which one embodiment may be implemented.

Referring to FIG. 1, an illustrative embodiment of a system that may be used to provide video content is illustrated and is generally designated 100. As shown, the system 100 may include a service provider tier 102 and a media device tier 104. Tiers 102, 104 are coupled to network 110, such as the Internet; and to a private access network 166 for communication. The private access network 166 may be, for example, a managed video content services access network or may be an Internet Protocol Television (IPTV) access network, as shown in more detail in FIG. 6.

In an illustrative embodiment, modems, such as a modem 122 may be coupled to the private access network 166. The service provider tier 102 may communicate with a representative media device 124 via the modem 122, for instance. The modem 122 may include a transceiver, such as transceiver 123 of modem 122, to receive and send data 184, for instance. The data 184 received may include video content, locator code data, and/or index display data.

The locator code data of a program or a program segment may include, for instance, a start time of the segment or the program, an end time of the segment or the program, a broadcast channel or access point of the program or the segment, a code associated with the program/segment (e.g., VCR+® code). The locator code data may include any other information that may be useful in recording a program/segment and/or in determining access to a locally recorded program/segment. The index display data may include data related to which of the several locally recorded programs and/or program segments are to be represented in an index display (as thumbnails, for instance), how they are to be presented, and in which order, as well as which component of the video program to operate on and what operation to perform on that component (e.g., generate a thumbnail image from the video frame at a given time, or pull out the closed caption text from time t1 to time t2), and any other information that may be useful in the index display format itself, or in representing the segments/programs in the index display.

The index display data for the presentation of the plurality of segments may include a presentation format, including a presentation order of the plurality of segments in a display through the media device. The order may be determined by the search terms or the search results. For example, a most relevant segment may be displayed in the index of the media device first and/or most prominently.

The transceiver 123 may receive the video content from a video content server 180 (or a service provider) on a first bandwidth, and may receive locator code data from the service provider on a second bandwidth that is lower than the first bandwidth. Embodiments herein may work with different bandwidth systems that combine higher quality bandwidths with narrower bandwidths, such as AT&T's HomeZone® (combining Satellite with DSL) and other embodiments that combine Satellite with WiMax, for example.

In another embodiment, the video content and the locator code data may be sent on the same bandwidth, and the locator code data may be sent quickly, in a short burst.

The video content may be sent on a high quality bandwidth, such as from a satellite source, cable source, IPTV source, on-air source, streaming media from the Internet or media downloaded from the Internet, as in a Podcast®, or any other suitable source. The locator code data may be sent via phone, DSL, WiMax, cable source, wireless source, IPTV source, satellite source, on-air source, or any other suitable source. The locator code data and/or the video content may be sent with an electronic program guide (EPG).

The locator code data is received at the receiver 123 in response to a search request associated with the recorded video content.

Because of the different bandwidths, the locator code data may be transmitted to the user separately from the content. The service provider may then avoid retransmitting content along with the locator code data, if desired. Further, because the content is not transmitted along therewith, the process of searching through the event index data and sending the associated locator code data may be more efficiently performed.

In other embodiments, the content and the locator code data are sent to the media device tier on the same bandwidth, either together or separately, as appropriate. Indexing information and/or the locator code data may be embedded in, and transmitted with, the content (e.g., in one of the lines in the vertical blanking interval for analog TV, or in the MPEG user data for digital TV). In another embodiment, the locator code data may not be sent to the media device. In this instance, the service provider may log data in the network, rather than logging data at the media device.

A lower bandwidth bi-directional communications link may send and/or receive data. For example, through the transceiver 123, the media device 124 may transmit information to a video content server 180 about what program the user is or has viewed to use, for example, in a customized web page, as discussed herein. The information concerning viewed programming may be sent through either a lower or higher bandwidth communications link.

Additionally or alternatively to the content servers 180, data 184 may be generated, associated, and provided by an outside database, the device 124, and/or a user of the device 124, in other embodiments not shown.

The service provider tier 102 may communicate with a large number of set-top boxes, such as the representative set-top box 124, over a wide geographic area, such as a regional area, a metropolitan area, a viewing area, a designated market area or any other suitable geographic area, market area, or subscriber or customer group that may be supported by networking the service provider tier 102 to numerous set-top box devices. In an illustrative embodiment, the client-facing tier, or any portion thereof, may be included at a video head-end office.

The media device 124 may include a cable box, a set-top box, a transmitter, a multifunctional device, a digital video recorder, a television, a mobile device (such as a mobile phone), a video cassette recorder, a personal computer, a multifunctional device, an image recorder (e.g., for pictures), an audio recorder (e.g., for satellite radio), or any other media device. The media device may include a user interface on a display 126 (such as a television monitor) associated with the media device 124, for instance.

In a particular embodiment, the service provider tier 102 may be coupled to modem 122 via fiber optic cables. Alternatively, the modem 122 may be digital subscriber line (DSL) modems that are coupled to one or more network nodes via twisted pairs, and the service provider tier 102 may be coupled to the network nodes via fiber-optic cables. Each set-top box device 124 may process data received via the private access network 166, via an IPTV software platform, such as Microsoft® TV IPTV Edition, as discussed in more detail with regard to FIG. 6.

The device 124 may transmit the data 184 to an external display device, such as the display device 126 for displaying content, such as a broadcast program or event, for instance.

The device 124 may communicate with the remote control 120. The device 124 may include a wireless transceiver (e.g., transmitter and/or receiver) 129 to communicate with a wireless transmitter/receiver (not shown) of the remote controls 120.

Figure 2:
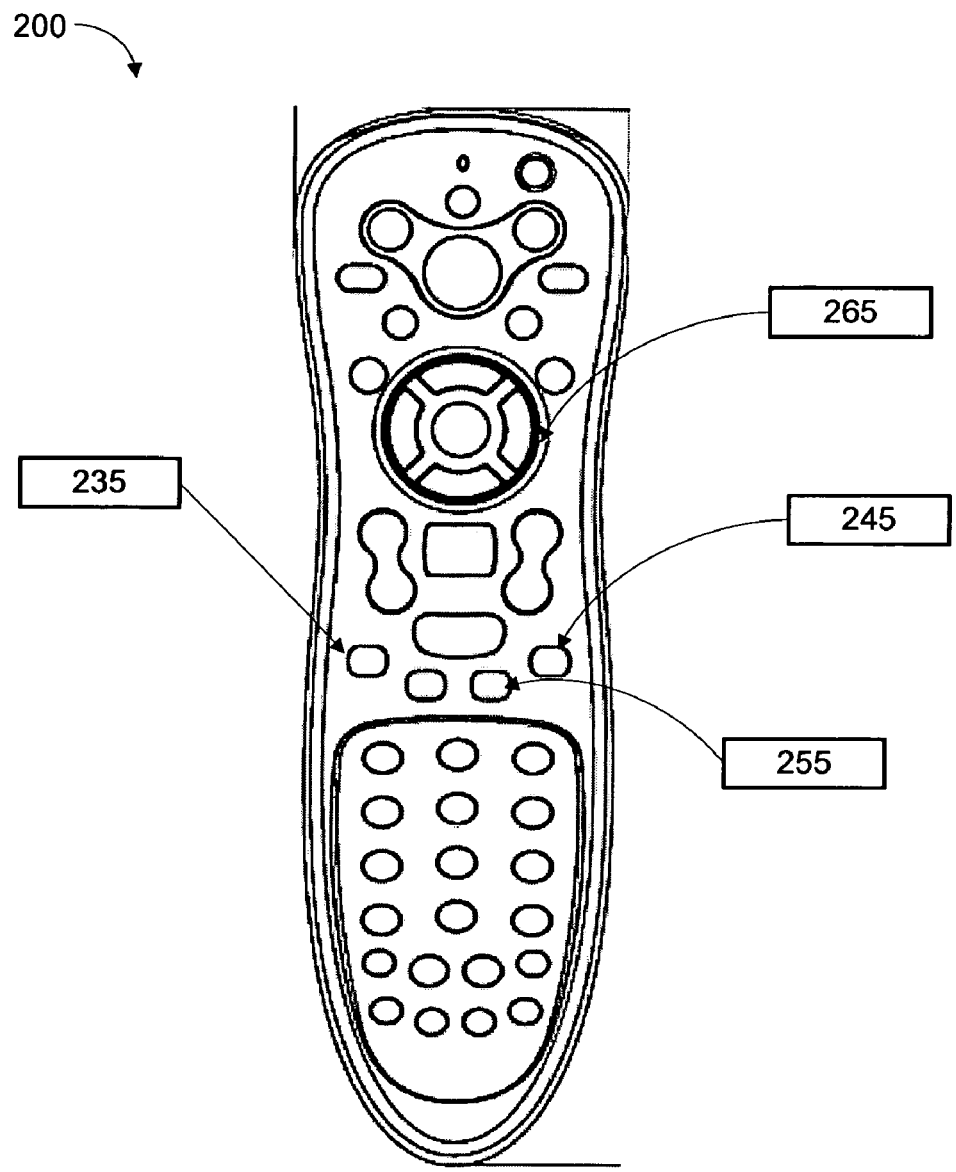
FIG. 2 illustrates a remote control according to an embodiment.

As shown in FIG. 2, the remote control 120 may include multiple features or indicators 121 capable of being selected to connect and interact with the device 124. The selections of the segment in the index may be made using features of one of the remote controls 120, as described in more detail herein. The set-top box device 124 may communicate commands (i.e., a search request or record an event or view a segment in the index) received from the remote control devices 120 to the service provider tier 102 via the private access network 166.

Further, the set-top box device 124 may include a STB processor, such as STB processor 170, and a STB memory device, such as STB memory 172, which is accessible to the STB processor 170. In one embodiment, a computer program, such as the STB computer program (STB CP) 174, may be embedded within the STB memory device 172.

The memory 172 of the device 124 may be coupled with a database 186 including recorded data 187, e.g., video content locally recorded from a transmission by a service provider. Each set-top box device 124 may also include a video content storage module, such as a digital video recorder (DVR) 176 shown in FIG. 1. In another embodiment, the DVR may be a network DVR.

The device 124 may include components that enable DVR functionality (not shown). For example, at least one analog/digital video tuner may be included in the device 124. The components may be added to the device 124 and to the tier 102 as the user may record an event locally, while the service provider is also recording the event. The device 124 and the service provider may record the event from either the same source or from a different source.

The device 124 further includes logic (e.g., STB CP 174) to record the content, to process the locator code data and the index display data, and to convert the locator code data and the index display data to the (segment) index display. The locator code data may represent images or frames of the video content and/or segments, or may represent textual information of the video content/segments. The frames and/or text may be extracted from the DVR content and/or database given the time information (from the locator code data), and given additional information regarding which component of the video data to operate on and what operation to perform (e.g., generate a thumbnail image from the video frame at a given time, or pull out the closed caption text from time t1 to time t2).

The segment text and images may be extracted from the locally recorded content using the video content servers 180 and/or the media device 124 to create a segment index page on the display. The extraction may take place from the local device such that it does not involve transmission of any content from the service provider. The segment frames and/or text may become part of the index display of FIGS. 3 and 4, for instance. The frames become thumbnails in the display, and the text may be associated with the frames, accordingly, as shown in FIG. 4. The presentation of the thumbnails, for example, and/or other elements of the index display may be determined by the index display data. The thumbnails in the index may be selected by the user to view a corresponding segment of the content, for example.

The client-facing tier 102 may also include one or more video content servers 180 that transmit video content requested by viewers via their set-top box 124. In an illustrative embodiment, the video content servers 180 may include one or more multicast servers. When a search request is submitted via the device 124, the requests may be transmitted to the video content servers 180 to be processed accordingly.

The event index data corresponding to segments of broadcasted events may be extracted using an index extraction service 181 of the video content servers 180. The service provider may extract event index data from the locally recorded event, automatically, by the index extraction service 181. The event index data may be stored on database 133. The event index data may include images or frames and associated text. The frames may be representative of the associated segments of the recorded event(s). The index extraction service 181 may generate the locator code data, which indicates where in a program the event index data (e.g., the text or picture representing the segment) may be located or the index extraction service may associate the event index data with the locator code data of the event(s). The locator code data may also be stored in the database 133 of the service provider. In an additional embodiment, the event index data may be extracted at the media device, wherein the media device includes the index extraction service 181.

While the service provider may store the actual thumbnail images and the text, this information may not be sent to the user. The information sent to the user (or the media device) is the action to be taken to extract the text and/or images from the locally recorded content at the user's location and the timing information associated with this extraction process, as described in more detail below.

The service provider may search the event index data extracted to search for event segment(s) associated with a search request from the user, for example, searching for a phrase from within a movie. The event index data may be searched by the index association service 182 for at least one segment of an event. The index association service 182 may also determine the index display data for a presentation of the segment(s) based on the search request. The search may include event index data associated with each broadcast event transmitted or received by the video content server, regardless of whether the local device 124 received and/or recorded the content.

In another embodiment, only segments from events that have been locally recorded at the media device 124 are found in the search by the index association service 182, such that the event index data found in the search (and subsequently transmitted to the media device) exclusively includes event index data associated with events previously locally recorded. In another additional embodiment, the event index data may be searched at the media device, wherein the media device includes the index association service 182.

Additionally or alternatively to the content servers 180, event index data may be generated, associated, and provided by an outside database, the device 124, and/or a user of the device 124, in other embodiments not shown. In an embodiment, the media device may be responsive to the index association service 182 to display the index, as described herein.

The service provider tier 102 may also include one or more video content servers 180 that transmit video content requested by viewers via their set-top boxes. In an illustrative embodiment, the video content servers 180 may include one or more multicast servers. The video content servers 180 may additionally or alternatively transmit audio content, and/or image content.

In an illustrative embodiment, the service provider tier 102 may include a transmitter 130 that manages communication between the service provider tier 102 and the private access network 166 and between the service provider tier 102 and the network 110. The transmitter 130 may send the content, locator code data, and/or the index display data to the media device. The means for transmitting the locator code data, and the index display data to the media device may include the transmitter 130.

As shown, the transmitter 130 is coupled to one or more image and data servers 132 for the database(s) 133 that store locator code data associated with images and text of broadcast programs. The means for storing includes the database of at least one of the service provider and the media device. In one embodiment, the database 133 stores the locator code data, but does not store the associated video content and/or the event index data itself (the images and text). In one embodiment, the database 133 stores the index display data for the index presentation of the plurality of segments. The database (s) 133 may also store events, such as broadcast events and related information. In an illustrative embodiment, the image and data servers 132 may be a cluster of servers, each of which may store still images, channel and program-related data, or any combination thereof. In this way, the database 133 is able to maximize capacity and retransmission of video content to the media device is avoided.

Example Remote Control

FIG. 2 illustrates a remote control 200 according to an embodiment. The remote control 200 may represent remote controls 120, 128 of FIG. 1 and their features or indicators 121 capable of being selected. The indicators may include icons (e.g., for use on an LCD screen), buttons, selection keys, a track ball, a wheel, and/or a switch of the remote control.

The features may include a search request feature 235 to reveal the prompt 127 for the search request to be made to the service provider, the search request being associated with segments of the recorded content. The remote control may have an interface to receive textual search requests via a triple-tap interface or another appropriate interface. For example, the remote control may have a keypad with buttons having numbers 0 to 9, and each keypad number button having, for example, 3 different letters associated therewith. Similar to a standard phone key pad, the remote control key pad has letters A, B, and C associated with number button "2". If this button is pressed once, number 2 may be displayed, and if the button is pressed twice quickly, the letter A is displayed. If the button is pressed thrice quickly, the letter B is displayed, and so on. Similarly, each of the letters of the alphabet may be displayed by pressing the appropriate remote control number button the appropriate number of times.

Figure 3:
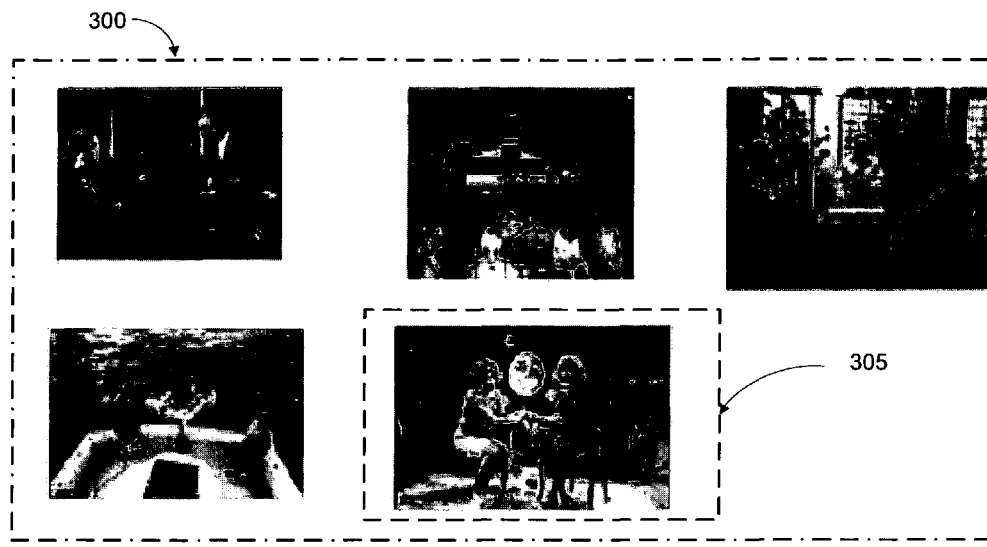
FIGS. 3 and 4 illustrate interfaces according to embodiments.
Figure 4:
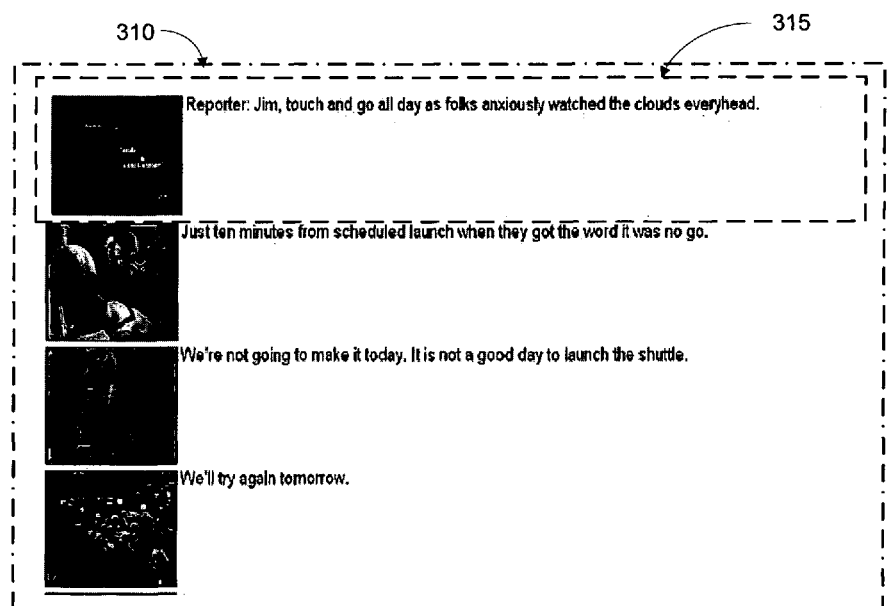

Additionally, the features may include a selection feature 245 to submit the search request (e.g., an "enter" or "OK" button), or to make a selection of a highlighted item or segment on the index (see highlighted items 310 and 360 of FIGS. 3 and 4, respectively). Upon selection of the segment, the recorded content associated therewith may be viewed. The indicators may also include a view index feature 255 to view an index on the display or interface, illustrated at FIGS.

3 and 4, for example. Feature(s) 265 may enable navigation through the segments of the index for selection and viewing.

Example Interfaces

FIGS. 3 and 4 illustrate interfaces 300 and 310, respectively, according to embodiments. Interface 300 includes a plurality of image thumbnails on the display 126. The image thumbnails may represent an index of segments of recorded content, the index being based on content search results, as described herein. Thumbnail 305 is highlighted and may be selected by the user for viewing the associated segment. The segment may be associated with locally recorded content. In an additional embodiment, the segment may be associated with remotely recorded content.

Interface 310 includes a plurality of image thumbnails with associated text, such as closed captions or subtitles or speech recognition, on the display 126. The thumbnails and associated text may represent an index of segments and may be associated with the search request described herein. The images (or text) may be browsed, using the remote control 220, and an image may be selected to jump to the corresponding point in the recorded content. Thumbnail 315 is highlighted and may be selected by the user for viewing the associated segment.

Flow Chart

Figure 5:
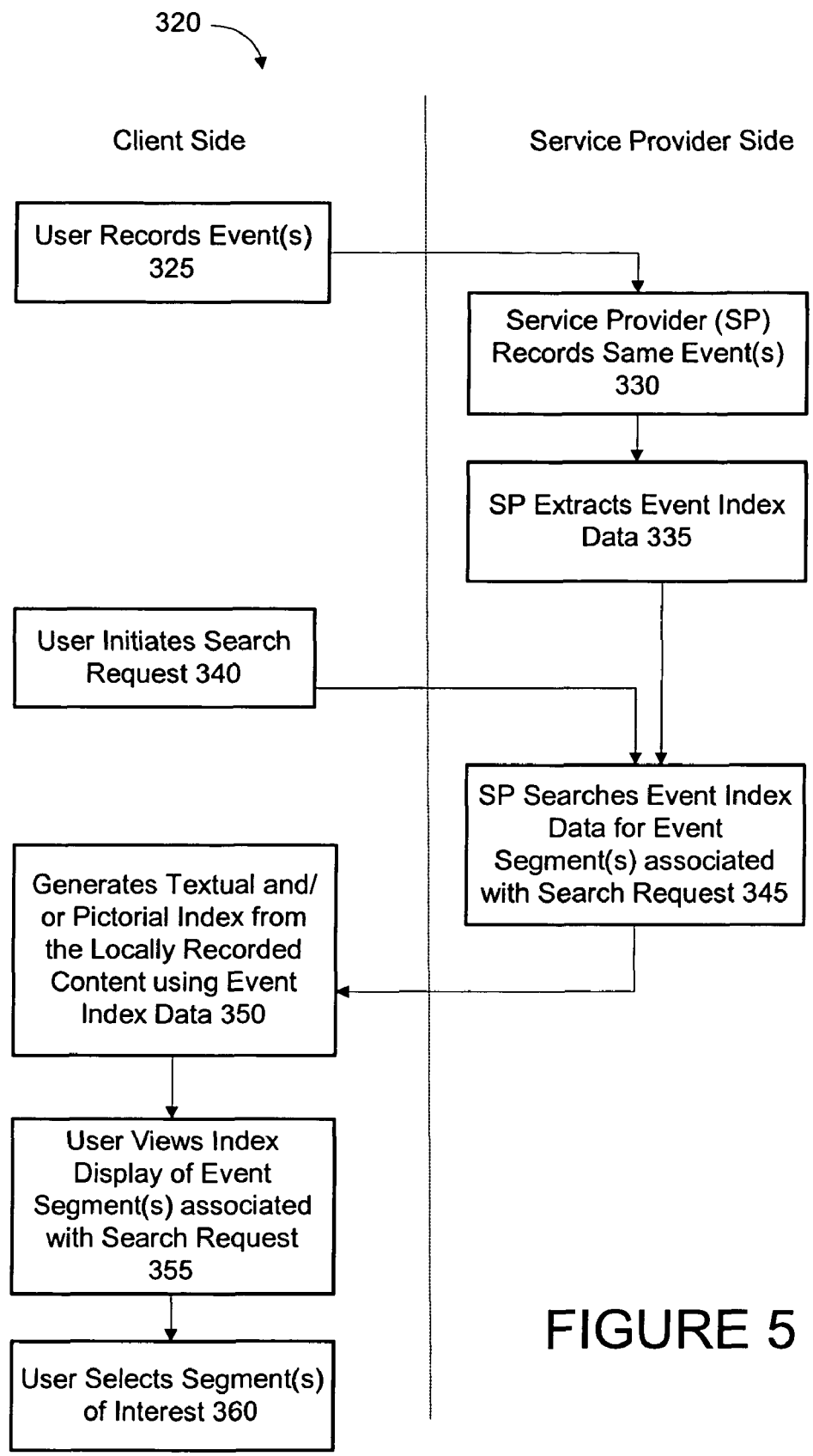
FIG. 5 illustrates a method according to an embodiment.

FIG. 5 illustrates a method 320 according to an embodiment. The steps described below may be performed under the control of a programmed processor, such as processor 502 and/or processor 170, or the logic may be implemented and distributed among hardware, firmware, software, or a combination thereof within the digital video recorder 176, for example.

The content may be directly recorded by the user on a local recorder. The user may schedule a local recording also by informing the service provider, the service provider then sends commands to the set-top box to program it. The service provider may record the scheduled event, as well, and extract the event index data. The service provider may then provide the locator code data without the original content or any of its media components, thereby avoiding both the possible bandwidth limitations between the user and the service provider, as well as the legal issues regarding the content.

At block 325, the user records event(s) on the media device 124, at the client side. The event may be included in the recorded data 187 of the database 186. The user may schedule a local recording by informing the service provider. The service provider then sends the commands to the local device 124 to program the box to record the content. The service provider then knows what program(s) the user is recording and then may record the program as well in block 330.

At block 330, on the service provider side, the service provider may record the same event(s) onto the database 133.

At block 335, the service provider may extract event index data from the recorded event. The information may be extracted automatically by the index extraction service 181 and stored on the database 133. The event index data may include images or frames and associated text. The event index data may include metadata regarding the broadcasted event, for instance, title, genre, date, channel, actor(s), synopsis, or other program information. The event index data may include content-based (linguistic content) data from the event, such as, closed captions, subtitles, automatic speech recognition (ASR) from the audio track, off-line transcripts, and images of the broadcasted event.

The frames may be representative of the associated segments of the recorded event(s). The index extraction service 181 may associate the event index data with locator code data, which indicates where in a program the event index data may be located. The locator code data may be stored in the database 133 of the service provider. In an additional embodiment, the event index data may be extracted at the media device, wherein the media device includes the index extraction service 181.

At block 340, the user initiates the search request. The user may use the remote control and/or the media device to prompt for the search request on the display and to submit the search request, as described herein. The search request may be submitted to the service provider. The search may be a text-based search for metadata, captions, subtitles or other textual information associated with segments of the recorded event(s).

At block 345, the service provider may search the event index data extracted at 335 for event segment(s) associated with the search request at block 340. The event index data may be searched automatically by the index association service 182. The search may include event index data associated with each broadcast event transmitted or received by the video content server 180, regardless of whether the local device 124 received and/or recorded the content. In another embodiment, only the event(s) locally recorded on the media device are searched by the index association service 182, such that the event index data found in the search (and subsequently transmitted to the media device) exclusively includes event index data associated with events previously recorded locally. In another additional embodiment, the event index data may be searched at the media device, wherein the media device includes the index association service 182.

At block 350, an index page is generated at the client side by extracting text and/or images from the locally recorded content to create a search result page (i.e., index display). The index display may be generated using the event index data transmitted from the service provider. In another embodiment, the index display may be generated using the associated locator code data, as described herein, transmitted from the service provider.

At block 355, the user may view the search results in an index display of event segment(s) associated with the search request. Index examples are illustrated at interfaces 300 and 310 of FIGS. 3 and 4, respectively.

A pictorial index of the entire program or event may be provided by the service provider to enable efficient content-based navigation of the event or video program. The thumbnail images that compose the pictorial index may be created at the user's end on the set-top box (STB) by pulling out certain frames of the video from the locally recorded content based on the information supplied by the service provider in the form of commands that, in addition to other information, carry the time/frame number for the given frame. The thumbnail images may alternatively be created by the service provider and transmitted as thumbnail images (rather than as locator code data and index display data) to the set-top box or device 124.

Using the index extraction service, the locator code data may be synchronized to the at least one broadcast event locally recorded at the media device. Synchronization may compensate for any possible lack of clock synchronization between the user and service provider or multiple service providers. For example, there may not be synchronization where video information and corresponding index information (e.g., locator code data and index display data) are supplied by different service providers. In another example, there may not be synchronization due to the differences in the starting point of the videos recorded by the user and recorded by the service provider. The differences in starting points may be due to different amounts of "padding" having to do with how many minutes in advance of the beginning of the program the recording started. When the content processed by the service provider and the DVR content are temporally synchronized, frames (i.e., thumbnails) corresponding to the locator code data may be extracted from the DVR content given the time information. A segment of text from the closed captions may also be extracted from the local content at the user's side by receiving 'in' and 'out' times from the service provider. Each segment of text may be associated with one of the frames.

In the event that the starting time of the content on the DVR does not match the timing of the program that the service provider processed to extract the index, the timing information does not match. There may be several possible reasons for the mismatch. The DVR may not have the correct time and/or the correct starting time of the recording process. Even if the starting times coincide, there may be some compression or expansion of time between the two versions of the recording due to inaccuracies in the respective systems' clock speed, resulting in a gradual shift of time between the two sources.

To circumvent any issues arising from any time shift between the DVR content and the locator code data, the data is automatically synchronized to the recording on the DVR. In particular, timing markers may be inserted in the content. Further, implicit information in the content, such as the audio or the scene-change information, may be used to establish correct time correspondence between the two sources. For example, the service provider may read a short segment of the audio from the beginning of the video program on the DVR and an end segment; perform audio matching to compute the time shift and time warp between the two sources; and apply corrections to compensate for any difference.

At block 360, from the index display, the user selects one of the thumbnails (or text) to view the corresponding segment of the content on the display. The selected content is played from the local client system, and may not be sent by the service provider upon selection.

In embodiments discussed herein, a DVR may receive or download an event from one of a variety of sources. The DVR may receive indexing information (e.g., locator code data and/or index display data) from a service provider (which may not even be the one providing the video itself), and the DVR may receive this information in a manner that does not involve sending any of the components of the content in its original form or even in a modified form.

Example Internet Protocol Television System Environment

Figure 6:
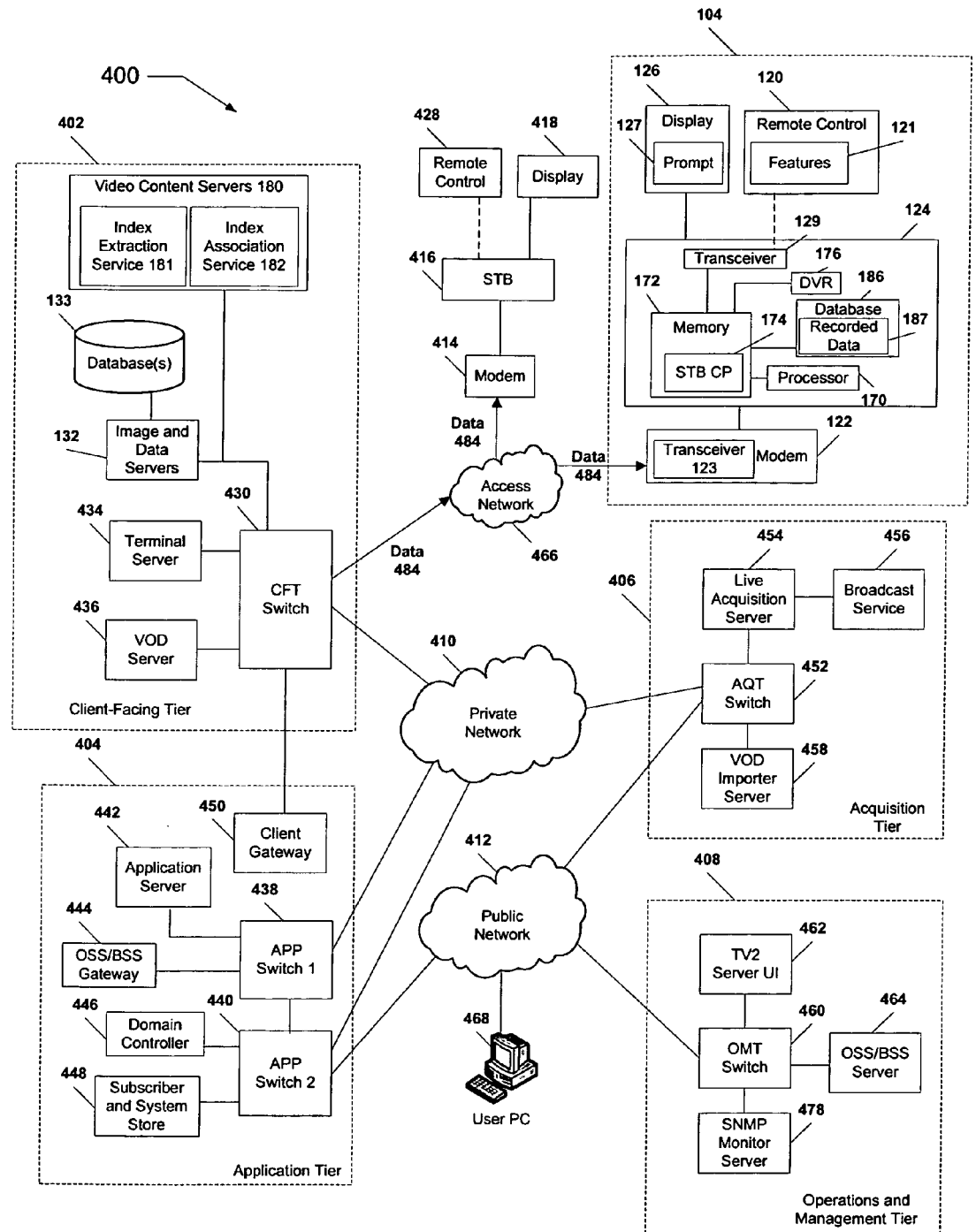
FIG. 6 illustrates an Internet Protocol Television (IPTV) system environment in which one embodiment may be implemented.

Referring to FIG. 6, an illustrative embodiment of an Internet Protocol Television (IPTV) system that may be used to provide video content is illustrated and is generally designated 400. As shown, the system 400 may include the media device tier 104, a client facing tier 402, an application tier 404, an acquisition tier 406, and an operations and management tier 408. Each tier 402, 404, 406, 408 is coupled to a private network 410; to a public network 412, such as the Internet; or to both the private network 410 and the public network 412. For example, the client-facing tier 402 may be coupled to the private network 410. Further, the application tier 404 may be coupled to the private network 410 and to the public network 412. The acquisition tier 406 may also be coupled to the private network 410 and to the public network 412. Additionally, the operations and management tier 408 may be coupled to the public network 412.

As illustrated in FIG. 6, the various tiers 402, 404, 406, 408 communicate with each other via the private network 410 and the public network 412. For instance, the client-facing tier 402 may communicate with the application tier 404 and the acquisition tier 406 via the private network 410. The application tier 404 may also communicate with the acquisition tier 406 via the private network 410. Further, the application tier 404 may communicate with the acquisition tier 406 and the operations and management tier 408 via the public network 412. Moreover, the acquisition tier 406 may communicate with the operations and management tier 408 via the public network 412. In a particular embodiment, elements of the application tier 404, including, but not limited to, a client gateway 450, may communicate directly with the client-facing tier 402.

As illustrated in FIG. 6, the client-facing tier 402 may communicate with user equipment via a private access network 466, such as an Internet Protocol Television (IPTV) access network. In an illustrative embodiment, modems, such as a first modem 414 and the modem 122 may be coupled to the private access network 466. The client-facing tier 402 may communicate with a first representative media device 416 via the first modem 414. The client-facing tier 402 has similar characteristics to the service provider tier 102 of FIG. 1. Like reference numerals designate similar elements in the drawing figures.

In a particular embodiment, the client-facing tier 402 may be coupled to the modems 414, 122 via fiber optic cables. Alternatively, the modems 414 and 122 may be digital subscriber line (DSL) modems that are coupled to one or more network nodes via twisted pairs, and the client-facing tier 402 may be coupled to the network nodes via fiber-optic cables. Each set-top box device 416, 124 may process data received via the private access network 466, via an IPTV software platform, such as Microsoft® TV IPTV Edition. The media device 124, 416 may include a user interface for IPTV on a display 126, 418, for instance. The set-top boxes 416, 124 may transmit the data 484 to the external display device 418, 126 for displaying content, such as a broadcast program or event, for instance. The first set-top box device 416 may communicate with a remote control 428.

In an illustrative embodiment, the client-facing tier 402 may include a client-facing tier (CFT) switch 430 that manages communication between the client-facing tier 402 and the private access network 466 and between the client-facing tier 402 and the private network 410. The switch 430 may act as a transmitter to send the content and/or locator code data to the media device. The means for transmitting the locator code data to the media device may include the switch 430.

The CFT switch 430 may also be coupled to a terminal server 434 that provides terminal devices with a connection point to the private network 410. In a particular embodiment, the CFT switch 430 may also be coupled to a video-on-demand (VOD) server 436 that stores or provides VOD content imported by the IPTV system 400.

As illustrated in FIG. 6, the application tier 404 may communicate with both the private network 410 and the public network 412. The application tier 404 may include a first application tier (APP) switch 438 and a second APP switch 440. In a particular embodiment, the first APP switch 438 may be coupled to the second APP switch 440. The first APP switch 438 may be coupled to an application server 442 and to an OSS/BSS gateway 444. In a particular embodiment, the application server 442 may provide applications to the set-top box devices 416, 124 via the private access network 466, which enable the set-top box devices 416, 124 to provide functions, such as display, messaging, processing of IPTV data and VOD material, etc. In a particular embodiment, the OSS/BSS gateway 444 includes operation systems and support (OSS) data, as well as billing systems and support (BSS) data. In one embodiment, the OSS/BSS gateway 444 may provide or restrict access to an OSS/BSS server 464 that stores operations and billing systems data. The BSS may contain or access the watched program log information, for usage billing purposes, for example.

Further, the second APP switch 440 may be coupled to a domain controller 446 that provides web access, for example, to users via the public network 412. For example, the domain controller 446 may provide remote web access to IPTV account information via the public network 412, which users may access using their personal computers 468. The second APP switch 440 may be coupled to a subscriber and system store 448 that includes account information, such as account information that is associated with users who access the system 400 via the private network 410 or the public network 412. In a particular embodiment, the application tier 404 may also include a client gateway 450 that communicates data directly with the client-facing tier 402. In this embodiment, the client gateway 450 may be coupled directly to the CFT switch 430. The client gateway 450 may provide user access to the private network 410 and the tiers coupled thereto.

In a particular embodiment, the set-top box devices 416, 124 may access the IPTV system 400 via the private access network 466, using information received from the client gateway 450. In this embodiment, the private access network 466 may provide security for the private network 410. User devices may access the client gateway 450 via the private access network 466, and the client gateway 450 may allow such devices to access the private network 410 once the devices are authenticated or verified. Similarly, the client gateway 450 may prevent unauthorized devices, such as hacker computers or stolen set-top box devices from accessing the private network 410, by denying access to these devices beyond the private access network 466.

For example, when the first representative set-top box device 416 accesses the system 400 via the private access network 466, the client gateway 450 may verify subscriber information by communicating with the subscriber and system store 448 via the private network 410, the first APP switch 438, and the second APP switch 440. Further, the client gateway 450 may verify billing information and status by communicating with the OSS/BSS gateway 444 via the private network 410 and the first APP switch 438. In one embodiment, the OSS/BSS gateway 444 may transmit a query across the first APP switch 438, to the second APP switch 440, and the second APP switch 440 may communicate the query across the public network 412 to the OSS/BSS server 464. After the client gateway 450 confirms subscriber and/or billing information, the client gateway 450 may allow the set-top box device 416 access to IPTV content and VOD content. If the client gateway 450 cannot verify subscriber information for the set-top box device 416, e.g., because it may be connected to an unauthorized twisted pair, the client gateway 450 may block transmissions to and from the set-top box device 416 beyond the private access network 466.

As indicated in FIG. 6, the acquisition tier 406 includes an acquisition tier (AQT) switch 452 that communicates with the private network 410. The AQT switch 452 may also communicate with the operations and management tier 408 via the public network 412. In a particular embodiment, the AQT switch 452 may be coupled to a live acquisition server 454 that receives television or movie content, for example, from a broadcast service 456. In a particular embodiment during operation of the IPTV system, the live acquisition server 454 may acquire television or movie content. The live acquisition server 454 may transmit the television or movie content to the AQT switch 452, and the AQT switch 452 may transmit the television or movie content to the CFT switch 430 via the private network 410.

Further, the television or movie content may be transmitted to the video content servers 480, where it may be encoded, formatted, stored, or otherwise manipulated and prepared for communication to the set-top box devices 416, 124. The CFT switch 430 may communicate the television or movie content (and the locator code data and the index display data) to the modems 414, 122 via the private access network 466. The set-top box devices 416, 124 may receive the television or movie content via the modems 414, 122, and may transmit the television or movie content to the display devices 418, 126. In an illustrative embodiment, video or audio portions of the television or movie content may be streamed to the set-top box devices 416, 124.

In an example, non-limiting embodiment, each set-top box device 416, 124 may receive content data 484, which may include video content and/or audio content or portions thereof, from the client-facing tier 402 via the private access network 466. The content data 484 may be associated with at least one program, such as a broadcast program itself. Multiple programs may be broadcast through the content data 484 at any given time, each with their own program content data.

Further, the AQT switch may be coupled to a video-on-demand importer server 458 that stores television or movie content received at the acquisition tier 406 and communicates the stored content to the VOD server 436 at the client-facing tier 402 via the private network 410. Additionally, at the acquisition tier 406, the video-on-demand (VOD) importer server 458 may receive content from one or more VOD sources outside the IPTV system 400, such as movie studios and programmers of non-live content. The VOD importer server 458 may transmit the VOD content to the AQT switch 452, and the AQT switch 452, in turn, may communicate the material to the CFT switch 430 via the private network 410. The VOD content may be stored at one or more servers, such as the VOD server 436.

When users issue requests for VOD content via the set-top box devices 416, 124, the requests may be transmitted over the private access network 466 to the VOD server 436, via the CFT switch 430. Upon receiving such requests, the VOD server 436 may retrieve the requested VOD content and transmit the content to the set-top box devices 416,124 across the private access network 466, via the CFT switch 430. The set-top box devices 416, 124 may transmit the VOD content to the display devices 418, 126. In an illustrative embodiment, video or audio portions of VOD content may be streamed to the set-top box devices 416, 124.

FIG. 6 further illustrates that the operations and management tier 408 may include an operations and management tier (OMT) switch 460 that conducts communication between the operations and management tier 408 and the public network 412. In the embodiment illustrated by FIG. 6, the OMT switch 460 is coupled to a TV2 server 462. Additionally, the OMT switch 460 may be coupled to an OSS/BSS server 464 and to a simple network management protocol (SNMP) monitor server 478 that monitors network devices within or coupled to the IPTV system 400. In a particular embodiment, the OMT switch 460 may communicate with the AQT switch 452 via the public network 412.

In an illustrative embodiment, the live acquisition server 454 may transmit the television or movie content to the AQT switch 452, and the AQT switch 452, in turn, may transmit the television or movie content to the OMT switch 460 via the public network 412. In this embodiment, the OMT switch 460 may transmit the television or movie content to the TV2 server 462 for display to users accessing the user interface at the TV2 server 462. For example, a user may access the TV2 server 462 using the personal computer (PC) 468 coupled to the public network 412.

Computer Architecture

Figure 7:
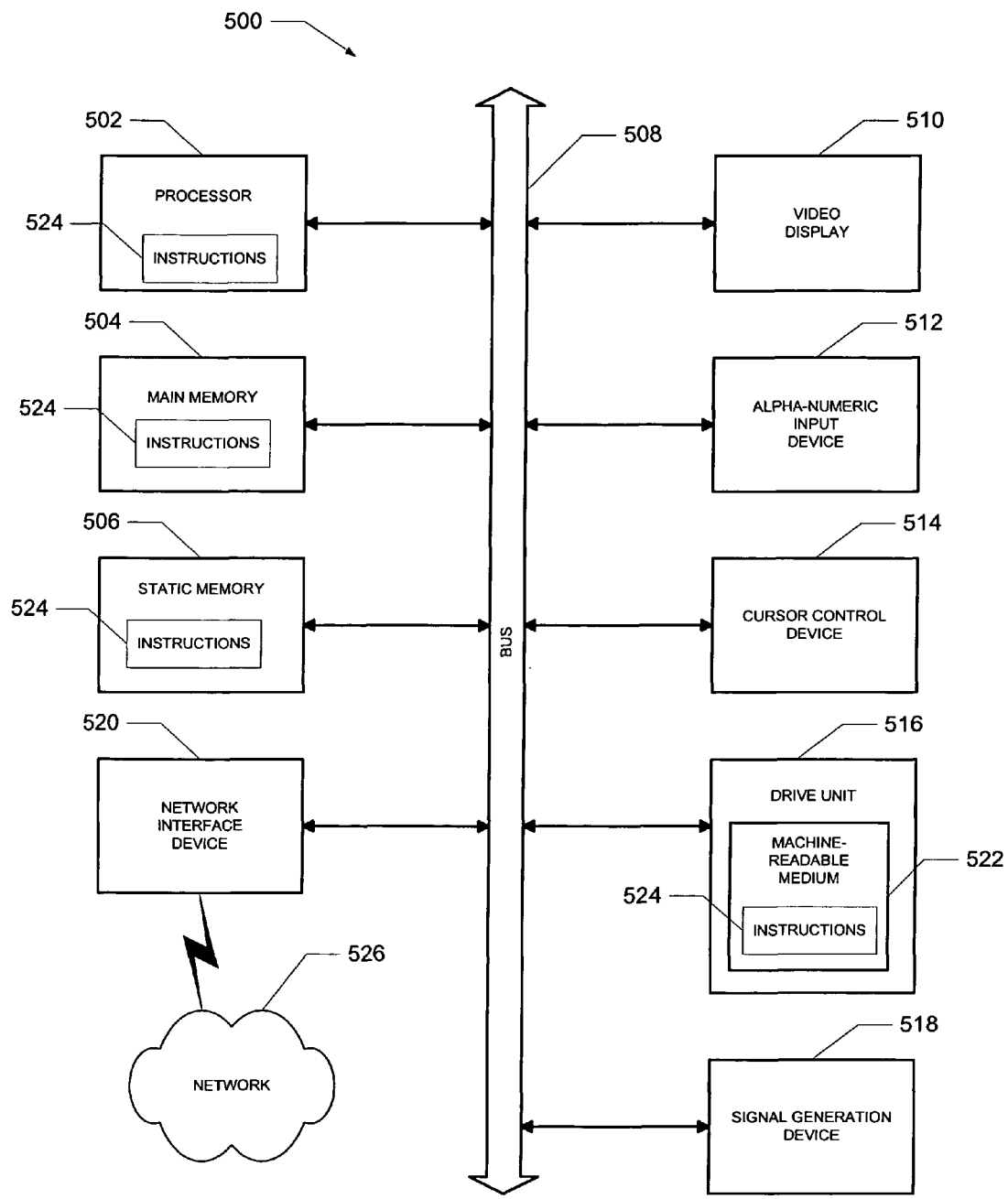
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a digital video recorder (DVR), a personal computer (PC), a tablet PC, a set-top box (STB), a Personal Digital Assistant (PDA), a handheld device, a portable audio/video player (Portable Media Player—PMP), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The main memory 504 and/or the static memory 506 may be used to store the recorded programs, and other data or information discussed herein. In an additional embodiment, the data may be stored in volatile memory.

The computer system 500 may further include a video display unit 510 (e.g., a television, a liquid crystal display (LCD) or a cathode ray tube (CRT)) on which to display broadcast or other programs, for example. The computer system 500 also includes an alphanumeric input device 512 (e.g., a keyboard or a remote control), a user interface (UI) navigation device 514 (e.g., a remote control, or a mouse), a disk drive unit 516, a signal generation device 518 (e.g., a speaker) and a network interface device 520.

The input device 512 and/or the navigation device 514 (e.g., the remote control) may include a processor (not shown), and a memory (not shown).

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 and/or the data stream 184 from the content provider may further be transmitted or received over a network 526 (e.g., a television cable provider) via the network interface device 520 utilizing any one of a number of well-known transfer protocols (e.g., broadcast transmissions, HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding a set of instructions for execution by the machine and that cause the machine to perform any one or more of the methodologies of the present invention, or that is capable of storing, or encoding data structures utilized by or associated with such a set of instructions. The term "machine-readable medium" shall accordingly be taken to include solid-state memories, optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
    an index extraction service to extract event index data from an event being locally recorded at an end user media device and corresponding to at least one video segment of the recorded event, the index extraction service also to associate the event index data with locator code data of the event;
    a storage device to record the extracted event index data and the associated locator code data;
    an index association service to search the extracted event index data for a plurality of video segments associated with the event, the search being associated with a search request, the index association service further to determine index display data for a presentation of the plurality of video segments in response to the search request; and
    a transmitter to send, to the media device, the index display data and the locator code data associated with the plurality of video segments and associated with the event to extract an image to present in an index, wherein the locator code data associated with the plurality of video segments is transmitted to the media device with the event and wherein the locator code data includes a start time and an end time of the at least one video segment of the recorded event and an access point of the at least one video segment of the recorded event;
    wherein the index display data and locator code data is sent via a private access network being an internet protocol television access network and transmitted along with an electronic program guide.

2. The system of claim 1 wherein the index display data for the presentation of the plurality of video segments includes a presentation format of the plurality of video segments in a display through the media device,
    wherein the locator code data is selected from a group including: a start time of the video segment, an end time of the video segment, an access point of the video segment, a broadcast channel of the video segment, a recording code associated with the video segment, any information useful in recording the video segment, and any other information useful in determining access to the video segment.

3. The system of claim 1 wherein the locator code data associated with the plurality of segments is transmitted to the media device simultaneously with the event.

4. The system of claim 3 wherein the locator code data is transmitted on a bandwidth that is lower than a bandwidth of the event.

5. The system of claim 1 wherein the event is selected from a group including video content, audio content, and image content.

6. The system of claim 1 wherein the event index data is selected from a group including text information associated with the event and pictorial information associated with the event.

7. The system of claim 1 wherein the index extraction service synchronizes the locator code data to the locally recorded event.

8. A method comprising:
   extracting event index data from an event being locally recorded at an end user media device and corresponding to at least one video segment of the recorded event and to associate the event index data with locator code data of the event, the media device including a memory coupled to a database and the event being locally recorded stored in the database, wherein extracting further includes identifying that the event is among a group including video content, audio content, and image content;
   storing the extracted event index data and the associated locator code;
   searching the extracted event index data for a plurality of video segments associated with the event, the search being associated with a search request;
   determining index display data for a presentation of the plurality of video segments based on the search request; and
   transmitting, to the media device, the locator code data associated with the plurality of video segments and associated with the event to extract an image to present from an index, and the index display data, wherein the locator code data is transmitted over an internet protocol television access network and transmitted along with an electronic program guide wherein the locator code data associated with at least one of the plurality of video segments is transmitted to the media device with the event and wherein the locator code data includes a start time and an end time of at least one video segment of the recorded event and an access point of the at least one video segment of the recorded event.

9. The method of claim 8 wherein determining further includes recognizing that the index display data for the presentation of the plurality of video segments includes a presentation order of the plurality of video segments in a display through the media device.

10. The method of claim 8 further comprising transmitting the locator code data associated with the plurality of video segments to the media device separately from the event.

11. The method of claim 8 wherein extracting further includes identifying that the locator code data associated with the plurality of video segments exclusively includes the locator code data of the locally recorded event.

12. The method of claim 8 further comprising synchronizing the locator code data to the locally recorded event.

13. The method of claim 8 further comprising extracting segment text and video segment images from the locally recorded event to create a segment index page at the media device, the segment index page created in a manner that does not involve retransmission of content.

14. A non-transitory machine-readable medium comprising instructions, which when implemented by one or more processors perform the following operations:
   extract event index data from event being locally recorded at an end user media device and corresponding to at least one video segment of the recorded event and to associate the event index data with locator code data of the event;
   store the extracted event index data and the associated locator code data;
   search the extracted event index data for a plurality of video segments associated with the event, the search being associated with a search request;
   determine index display data for a presentation of the plurality of video segments based on the search request; and
   transmit, to the media device, the locator code data associated with the plurality of video segments and associated with the event to extract an image to present from an index, and the index display data, wherein the locator code data is transmitted over an internet protocol television access network and transmitted along with an electronic program guide wherein the locator code data associated with the plurality of video segments is transmitted to the media device with the event and wherein the locator code data includes a start time and an end time of at least one video segment of the recorded event and an access point of the at least one video segment of the recorded event.

15. The machine-readable medium of claim 14, wherein determining further includes recognizing that the index display data for the presentation of the plurality of segments includes a presentation order of the plurality of segments in a display through the media device.

16. The machine-readable medium of claim 14 further comprising instructions, which when implemented by one or more processors perform the following operations:
   transmit the locator code data associated with the plurality of video segments to the media device separately from the event.

17. The machine-readable medium of claim 14, wherein extracting further includes identifying that the event is among a group including video content, audio content, and image content.

18. The machine-readable medium of claim 14, wherein extracting further includes identifying that the locator code data associated with the plurality of video segments exclusively includes the locator code data of the locally recorded event.

19. The machine-readable medium of claim 14 further comprising instructions, which when implemented by one or more processors perform the following operations:
   synchronize the locator code data to the locally recorded event.

20. The machine-readable medium of claim 14 further comprising instructions, which when implemented by one or more processors perform the following operations:
   extract segment text and segment images from the locally recorded event to create a segment index page at the media device, the segment index page created in a manner that does not involve retransmission of content.

21. The system of claim 1, wherein the extracted event index data includes at least one of an image, text or a combination thereof.

22. The method of claim 8, wherein the extracted event index data includes at least one of an image, text or a combination thereof.

23. The machine-readable medium of claim 14, wherein the extracted event index data includes at least one of an image, text or a combination thereof.

* * * * *